(12) United States Patent
Tomi et al.

(10) Patent No.: US 6,335,064 B1
(45) Date of Patent: Jan. 1, 2002

(54) LIQUID CRYSTAL COMPOSITIONS AND LIQUID CRYSTAL DISPLAY DEVICES

(75) Inventors: Yoshitaka Tomi, Moriyama; Fusayuki Takeshita, Sodegaura; Etsuo Nakagawa, Ichihara, all of (JP)

(73) Assignee: Chisso Corporation, Osaka-Fu (JP)

( * ) Notice: Subject to any disclaimer, the term of this patent is extended or adjusted under 35 U.S.C. 154(b) by 0 days.

(21) Appl. No.: 09/641,916

(22) Filed: Aug. 21, 2000

Related U.S. Application Data

(63) Continuation of application No. 09/388,445, filed on Sep. 2, 1999, now abandoned.

(30) Foreign Application Priority Data

Sep. 10, 1998 (JP) .................................................. 10-256410

(51) Int. Cl.[7] ............................. C09K 19/30; C09K 19/12
(52) U.S. Cl. ................. 428/1.1; 252/299.63; 252/299.66
(58) Field of Search ........................ 252/299.63, 299.66; 428/1.1

(56) References Cited

U.S. PATENT DOCUMENTS

| 5,589,102 A | * | 12/1996 | Bartmann et al. | ...... 252/299.01 |
| 5,728,319 A | * | 3/1998 | Matsui et al. | ........... 252/299.63 |
| 5,792,386 A | * | 8/1998 | Matsui et al. | ........... 252/299.01 |
| 5,858,270 A | * | 1/1999 | Matsui et al. | ........... 252/299.01 |
| 5,858,272 A | * | 1/1999 | Haseba et al. | .......... 252/299.61 |
| 5,961,881 A | * | 10/1999 | Andou et al. | ........... 252/299.63 |
| 6,007,740 A | * | 12/1999 | Andou et al. | ........... 252/299.63 |

FOREIGN PATENT DOCUMENTS

| JP | 8-73857 | 3/1996 |
| JP | 9-31460 | 2/1997 |
| WO | 96/11897 | 4/1996 |

OTHER PUBLICATIONS

"Electro–Optic Response Times in Liquid Crystals" by Jakeman et al., Physics Letters, vol. 39A, No. 1 (Apr. 10, 1972), pp. 69–70.

* cited by examiner

*Primary Examiner*—Shean C. Wu
(74) *Attorney, Agent, or Firm*—McDermott, Will & Emery

(57) ABSTRACT

A novel liquid crystal composition comprising three components: at least one difluoro-oxymethane derivative, at least one trifluorophenyl derivative and a monofluorophenyl derivative. The composition exhibits a high voltage holding ratio at high temperatures, sufficiently low threshold voltage and large optical anisotropy, while satisfying general characteristics required for the AM-LCD display mode.

3 Claims, No Drawings

LIQUID CRYSTAL COMPOSITIONS AND LIQUID CRYSTAL DISPLAY DEVICES

This appln is a cont of Ser. No. 09/388,445 filed Sep. 2, 1999, abn.

FIELD OF THE INVENTION

This invention relates to a nematic liquid crystal composition. More particularly, the invention relates to a liquid crystal composition suitable for an active-matrix (AM) mode and to a liquid crystal display device using the liquid crystal composition.

BACKGROUND OF THE INVENTION

The liquid crystal display device of the active-matrix mode (AM-LCD) is the center of attention as the favorite of LCD, since it permits a high-definition display. It has been applied for a display screen of laptop computers, digital still camera, digital video camera and the like.

The AM-LCD liquid crystal compositions have required the following characteristics (1) to (5).

(1) The liquid crystal composition should exhibit a nematic phase in as wide a temperature range as possible in order to extend an environmental temperature at which the liquid crystal display device is used. (The upper-limit temperature of the nematic phase is increased as high as possible and the lower-limit temperature of the nematic phase is reduced as low as possible.)

(2) A viscosity of the liquid crystal composition should be reduced as low as possible in order to decrease a response time of the liquid crystal display device.

(3) An optical anisotropy ($\Delta n$) of the liquid crystal composition can take a suitable value depending on a cell thickness (d) of the liquid crystal display device in order to increase a contrast of the liquid crystal display device.

(4) A specific resistance of the liquid crystal composition should be increased and a voltage holding ratio of a cell in which the liquid crystal composition is contained should be increased in order to increase a contrast of the liquid crystal display device. In particular, a voltage holding ratio at high temperatures should be increased. The measurement of the voltage holding ratio at high temperatures is equivalent to an accelerated test to make sure of the durability of the liquid crystal composition.

(5) A threshold voltage of the liquid crystal composition should be reduced in order to provide a smaller-sized battery serving as a power for driving the liquid crystal display device.

In view of such background, Japanese Patent Kokai 8-73857 discloses the liquid crystal compositions having high voltage holding ratios, low threshold voltage and moderately large optical anisotropy. Japanese Patent Kokai 9-31460 also discloses the liquid crystal compositions particularly having low threshold voltage, good compatibility at low temperatures and a wide temperature range of a nematic phase.

As liquid crystal compounds for low-voltage driving in various modes including AM and STN modes, WO 96/11897 discloses new liquid crystalline compounds having large dielectric anisotropy and very low viscosity as well as liquid crystal compositions containing said compounds.

The liquid crystalline compounds having large dielectric anisotropy are required to use in order to reduce the threshold voltage of the liquid crystal composition. In general, the use of the liquid crystalline compounds having large dielectric anisotropy for the preparation of the liquid crystal composition increases the viscosity of the liquid crystal composition. A response time is proportional to the square of a cell gap, as proposed by E. Jakeman et al., Phys. Lett., 39A (1972) 69. Accordingly, the liquid crystal display device using the liquid crystal composition having reduced threshold voltage becomes slow at the response rate. To decrease a response time, it is recommendable to reduce a thickness (d) of a cell for the liquid crystal display device. However, it is necessary to set a value expressed by a product ($\Delta n \cdot d$) of a cell thickness (d) and an optical anisotropy ($\Delta n$) of the liquid crystal composition at a predetermined value of about 0.5 in order to obtain high contrast under the first-minimum condition for TN mode, as shown in the above item (3). Reducing a cell thickness necessitates an increase in an optical anisotropy of the liquid crystal composition.

The compositions disclosed in Japanese Patent Kokai 8-73857 have the problems that the threshold voltage is low, the optical anisotropy is moderately large, but the upper-limit temperature of a nematic phase is too low and the voltage holding ratio at high temperatures is low, or they have the problems that the optical anisotropy is moderately large, the upper-limit temperature of a nematic phase is high, but the threshold voltage is too high and the voltage holding ratio at high temperatures is low, as shown in comparative examples which will be given later.

The compositions disclosed in Japanese Patent Kokai 9-31460 have the problems that the optical anisotropy is small, the threshold voltage is high and the upper-limit temperature of a nematic phase is low, as shown in comparative examples which will be given later. The liquid crystal compositions for AM-LCD disclosed in WO 96/11897, those in which no compound having a cyano group at the end group is contained have the problems that the threshold voltage is not sufficiently low and the optical anisotropy is small, as shown in comparative examples which will be given later. (The compounds having a cyano group cannot be used as the liquid crystal composition for AM-LCD, because of the voltage holding ratio being low.)

Thus a liquid crystal composition for AM-LCD has not been known which satisfies the requirements of keeping the voltage holding ratio at high temperatures high, having sufficiently low threshold voltage and large optical, as shown in comparative examples which will be given lateranisotropy, while satisfying the characteristics (1) to (4) as mentioned above.

SUMMARY OF THE INVENTION

An object of the invention is to provide a liquid crystal composition especially having high voltage holding ratio at high temperatures, sufficiently low threshold voltage and large optical anisotropy, while satisfying general characteristics required for AM-LCD.

Through our intensive studies on compositions using various liquid crystalline compounds in an effort to solve the above-mentioned problems, we have found that the above object can be achieved by using the liquid crystal composition of the present invention in a display device for AM-LCD.

DETAILED DESCRIPTION OF THE INVENTION

The present invention provides a liquid crystal composition which comprises:

as a first component at least one of the compounds of the following formulas (1-1) and (1-2); and
as a second component at least one of the compounds of the following formulas (2-1) to (2-3)

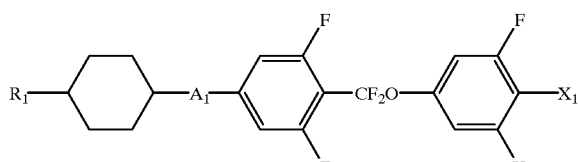

(1-1)

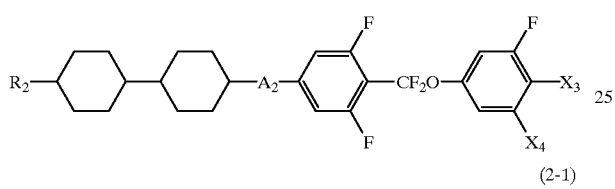

(1-2)

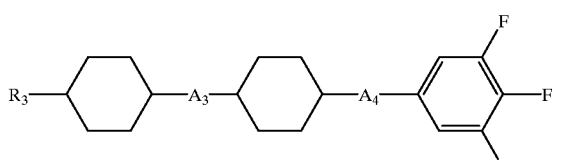

(2-1)

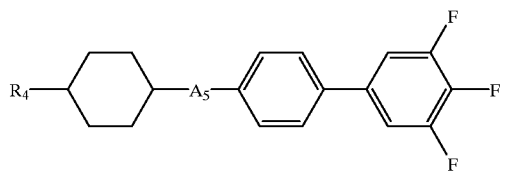

(2-2)

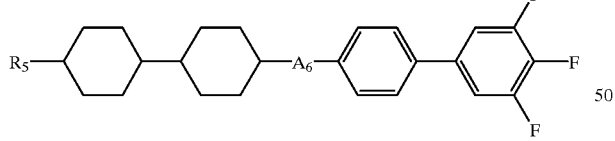

(2-3)

in which $R_1$, $R_2$, $R_3$, $R_4$ and $R_5$ each independently represent an alkyl group of 1–10 carbons; $A_1$, $A_2$, $A_3$, $A_4$, $A_5$ and $A_6$ each independently represent —$CH_2CH_2$— or a single bond, provided that at least one of $A_3$ and $A_4$ is a single bond; $X_1$ and $X_3$ each independently represent F, —$OCF_3$ or —$OCF_2H$; and $X_2$ and $X_4$ each independently represent H or F.

In one embodiment of the liquid crystal composition, the first component comprises 20–70% by weight and the second component comprises 30–80% by weight, based on the total weight of the liquid crystal composition.

The liquid crystal composition of the invention may further comprise as a third component at least one of the compounds of the following formula (3)

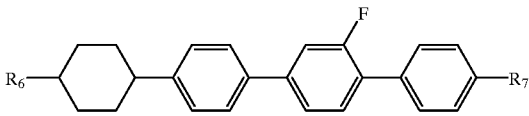

(3)

wherein $R_6$ and $R_7$ each independently represent an alkyl group of 1–10 carbons. In one embodiment of said liquid crystal composition, the first component comprises 20–70% by weight, the second component comprises 30–80% by weight and the third component comprises not more than 20% by weight, preferably 5 to 15% by weight, based on the total weight of the liquid crystal composition.

Further, the present invention provides a liquid crystal display device using each of the above-described liquid crystal compositions according to the present invention.

PREFERRED EMBODIMENTS OF THE INVENTION

Preferred examples of the compounds of formula (1-1) used in the liquid crystal composition of the invention can include those of the following formulas (1-1-1) to (1-1-12):

(1-1-1)

(1-1-2)

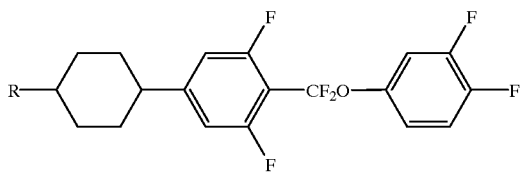

(1-1-3)

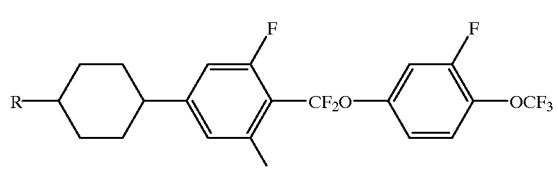

(1-1-4)

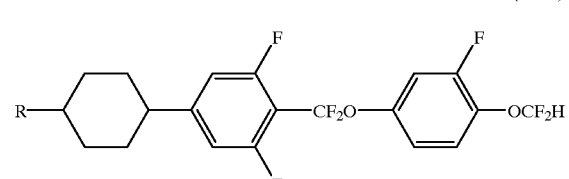

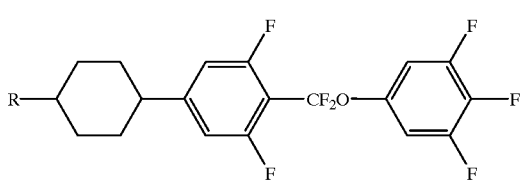

(1-1-5)
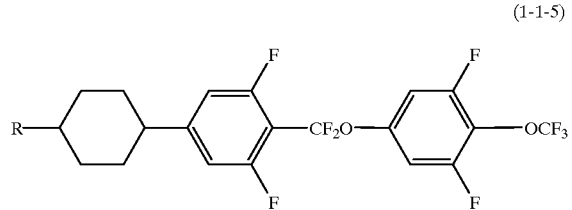
(1-1-6)
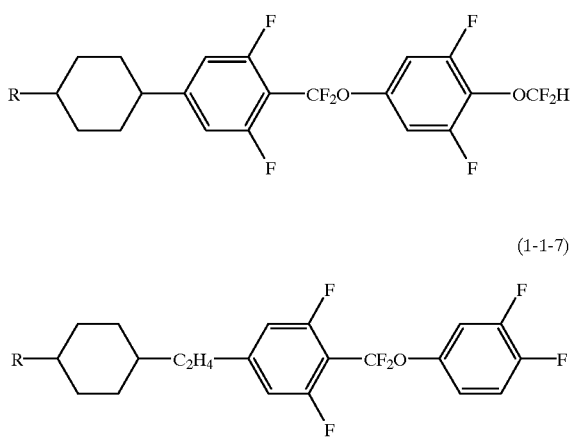
(1-1-7)
(1-1-8)
(1-1-9)
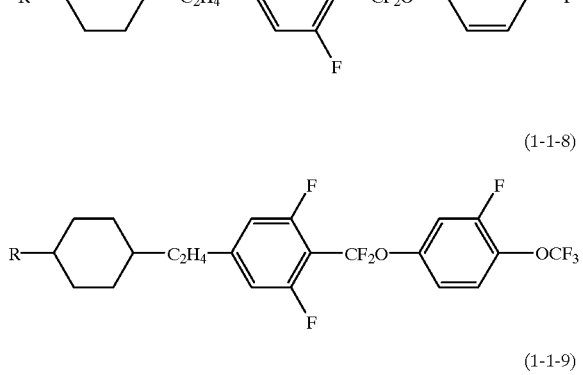
(1-1-10)
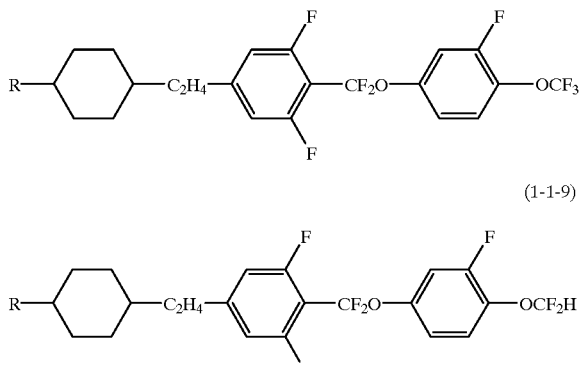
(1-1-11)
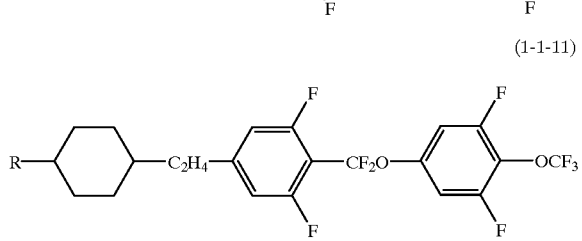
(1-1-12)
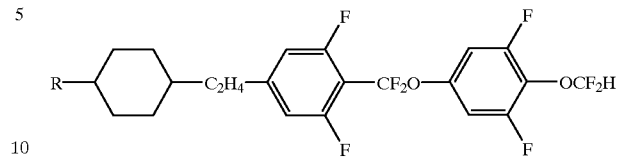
in which R represents an alkyl group of 1–10 carbons.
Preferred examples of the compounds of formula (1-2) used in the liquid crystal composition of the invention can include those of the following formulas (1-2-1) to (1-2-12):
(1-2-1)
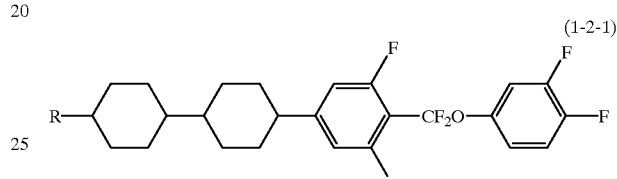
(1-2-2)
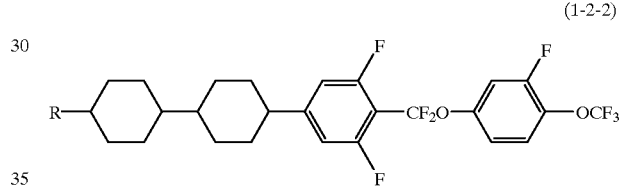
(1-2-3)
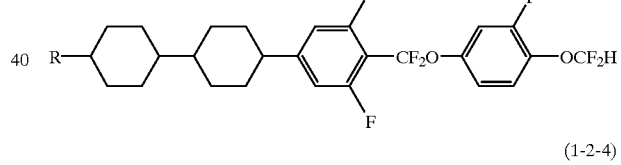
(1-2-4)
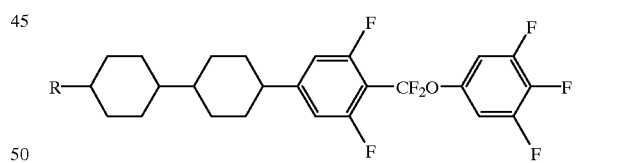
(1-2-5)
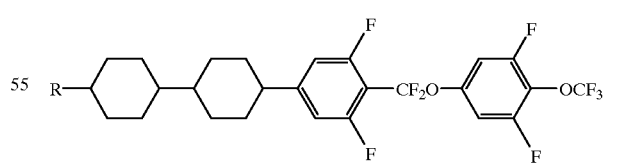
(1-2-6)
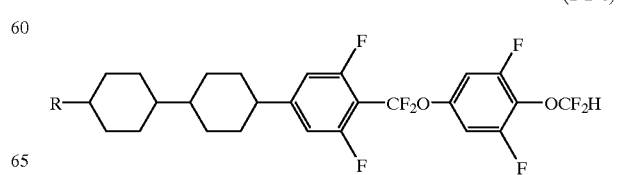

-continued (1-2-7)
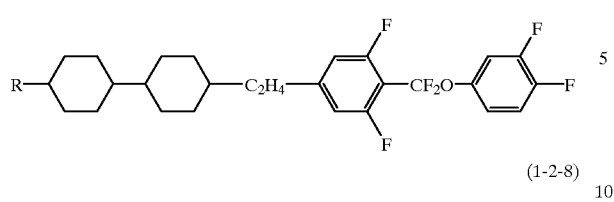

(1-2-8)
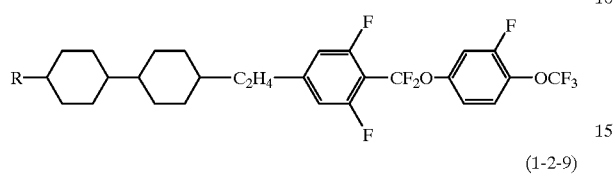

(1-2-9)
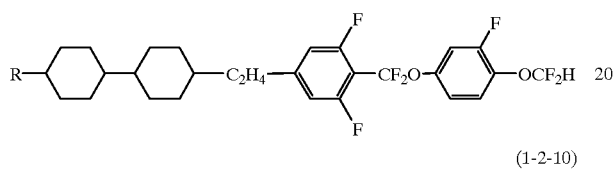

(1-2-10)
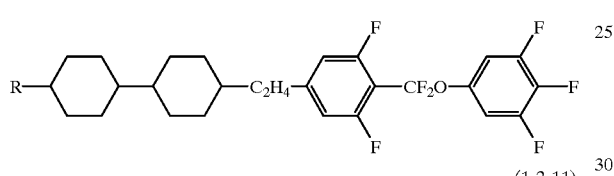

(1-2-11)
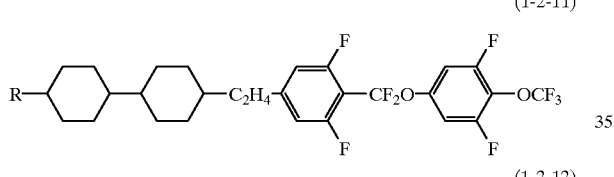

(1-2-12)
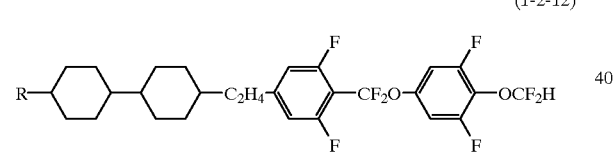

in which R represents an alkyl group of 1–10 carbons.

Preferred examples of the compounds of formula (2-1) used in the liquid crystal composition of the invention can include those of the following formulas (2-1-1) to (2-1-3):

(2-1-1)
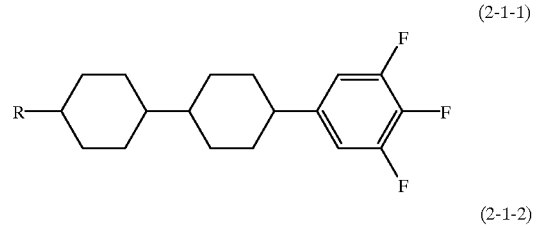

(2-1-2)
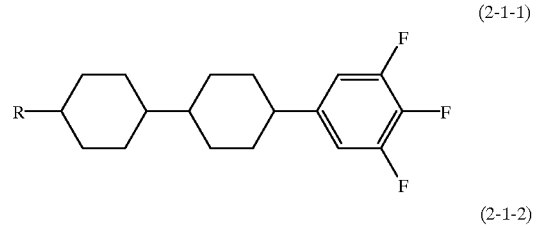

-continued (2-1-3)
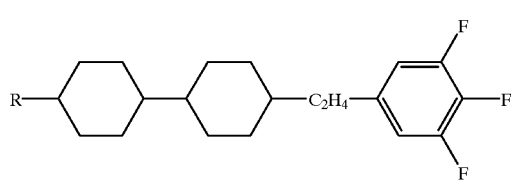

in which R represents an alkyl group of 1–10 carbons.

Preferred examples of the compounds of formula (2-2) used in the liquid crystal composition of the invention can include those of the following formulas (2-2-1) to (2-2-2):

(2-2-1)
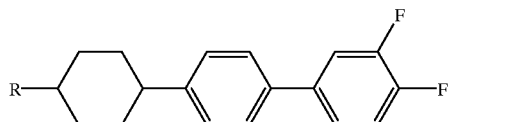

(2-2-2)
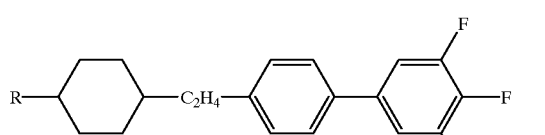

in which R represents an alkyl group of 1–10 carbons.

Preferred examples of the compounds of formula (2-3) used in the liquid crystal composition of the invention can include those of the following formulas (2-3-1) to (2-3-2):

(2-3-1)
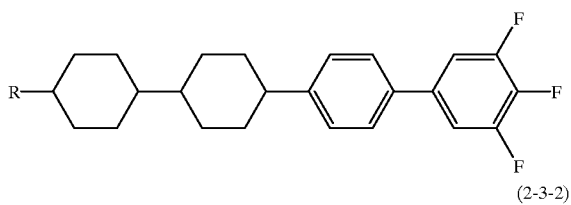

(2-3-2)
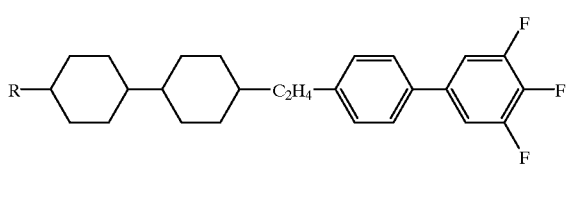

in which R represents an alkyl group of 1–10 carbons.

Preferred examples of the compounds of formula (3) used in the liquid crystal composition of the invention can include those of the following formula (3-1):

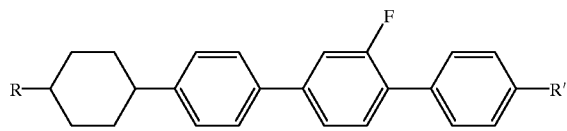

(3-1)

wherein R and R' each independently represent an alkyl group of 1–10 carbons.

The object for using each compound constituting the liquid crystal composition of the invention will be explained below.

The compounds of formula (1-1) are characterized in that the dielectric anisotropy is considerably large, the viscosity is relatively low, the optical anisotropy is relatively large and the specific resistance is high. Thus the compounds of formula (1-1) are used for the purpose of keeping the viscosity relatively low, increasing the optical anisotropy to a relatively large level and reducing the threshold voltage to a considerably low level, while keeping the voltage holding ratio at high temperatures of the liquid crystal composition high.

The compounds of formula (1-2) are characterized in that the dielectric anisotropy is considerably large, the viscosity is relatively low, the optical anisotropy is relatively large, the specific resistance is high and the upper-limit temperature of a nematic phase is higher than the compounds of formula (1-1). Thus the compounds of formula (1-2) are used for the purpose of keeping the viscosity relatively low and reducing the threshold voltage to a considerably low level while maintaining the voltage holding ratio at high temperatures of the liquid crystal composition high, and further increasing the upper-limit temperature of a nematic phase high while keeping the optical anisotropy relatively large.

The compounds of formula (2-1) are characterized in that the positive dielectric anisotropy is smaller than the compounds of formulas (1-1) and (1-2), and the viscosity is lower and the specific resistance is higher than the compounds of formulas (1-1) and (1-2), and further the optical anisotropy is smaller than the compounds of formulas (1-1) and (1-2). Thus the compounds of formula (2-1) are used for the purpose of reducing the viscosity, adjusting the threshold voltage and the optical anisotropy, while keeping the voltage holding ratio at high temperatures of the liquid crystal composition high.

The compounds of formula (2-2) are characterized in that the positive dielectric anisotropy is smaller than the compounds of formulas (1-1) and (1-2), the viscosity is lower than the compounds of formula (1-1) or (1-2) and the specific resistance is higher than the compounds of formulas (1-1) and (1-2) and further the optical anisotropy is substantially equal to that of the compounds of formulas (1-1) and (1-2). Thus the compounds of formula (2-2) are used for the purpose of reducing the viscosity, adjusting the threshold voltage and more increasing the optical anisotropy, while keeping the voltage holding ratio at high temperatures of the liquid crystal composition high.

The compounds of formula (2-3) are characterized in that the positive dielectric anisotropy is smaller and the specific resistance is higher, than those of the compounds of formulas (1-1) and (1-2) and the upper-limit temperature of a nematic phase is higher than that of the compounds of formula (2-2). Thus the compounds of formula (2-3) are used for the purpose of increasing the upper-limit temperature of a nematic phase and adjusting the threshold voltage, while keeping the voltage holding ratio at high temperatures of the liquid crystal composition high.

The compounds of formula (3) are characterized in that the dielectric anisotropy is approximately zero, the specific resistance is high, the optical anisotropy is considerably large and the upper-limit temperature of a nematic phase is considerably high. Thus the compounds of formula (3) are used for the purpose of increasing the upper-limit temperature of a nematic phase, adjusting the threshold voltage and increasing the optical anisotropy, while keeping the voltage holding ratio at high temperatures of the liquid crystal composition high.

A preferable component ratio of each compound constituting the liquid crystal composition of the present invention and the reason therefor will be explained below.

Incorporating a large quantity of the compounds of formula (1-1) or (1-2) into the liquid crystal composition may result in raising the lower-limit temperature of a nematic phase in the liquid crystal composition. For this reason, it is desirable that the compounds of formula (1-1) or (1-2) constitute not more than 70% by weight of the liquid crystal composition. Further, it is desirable that the compounds of formula (1-1) or (1-2) constitute not less than 20% by weight of the liquid crystal composition in order to reduce the threshold voltage while keeping the voltage holding ratio at high temperatures of the liquid crystal composition high.

Incorporating a large quantity of the compounds of formulas (2-1) to (2-3) into the liquid crystal composition may result in raising the lower-limit temperature of a nematic phase in the liquid crystal composition. For this reason, it is desirable that the compounds of formulas (2-1) to (2-3) constitute not more than 80% by weight of the liquid crystal composition. Further, it is desirable that the compounds of formulas (2-1) to (2-3) constitute not less than 30% by weight of the liquid crystal composition in order to reduce the viscosity or increase the upper-limit temperature of a nematic phase while keeping the voltage holding ratio at high temperatures of the liquid crystal composition high and keeping the threshold voltage low.

Incorporating a large quantity of the compounds of formula (3) into the liquid crystal composition may result in raising the lower-limit temperature of a nematic phase in the liquid crystal composition and increasing the threshold voltage. For this reason, it is desirable that the compounds of formula (3) constitute not more than 20% by weight, preferably 5 to 15% by weight, of the liquid crystal composition.

Each of the compounds constituting the composition of the present invention can be synthesized by the prior art processes.

Of the compounds of formulas (1-1) and (1-2), the method of synthesizing those of formulas (1-1-4) and (1-2-4) is disclosed in Japanese Patent Kokai 9-72708. Of the compounds of formulas (2-1), (2-2) and (2-3), the method of synthesizing those of formulas (2-1-1), (2-2-1) and (2-3-2) is disclosed in Japanese Patent Kokai 2-233626. Of the compounds of formula (3), the method of synthesizing those of formula (3-1) is disclosed in Japanese Patent Kokai 2-237949.

Other liquid crystalline compounds than the compounds represented by the above-mentioned formulas can be used in admixture therewith in the liquid crystal composition within the range not injuring the object of the present invention. To the liquid crystal composition of the present invention may be added chiral dopants such as cholesteric nonanoate for the purpose of inducing the helical structure of liquid crystal molecules to adjust necessary twist angle. The liquid crystal composition of the invention can be also used as a liquid crystal composition for guest-host (GH) mode by incorporating therein dichroic dyes such as those of merocyanines, styryl derivatives, azo compounds, azomethines, azoxy compounds, quinophthalones, anthraquinones and tetrazine derivatives, etc. Also, the liquid crystal composition of the invention can be used as a liquid crystal composition for a polymer-dispersion type display device and for electrically controlled birefringence (ECB) mode and dynamic scattering (DS) mode. Further, the present composition can be used as a liquid crystal composition for an in-plain switching mode.

The liquid crystal composition of the invention is prepared by a process conventional per se. In general, a process can be employed wherein various compounds are mixed and dissolved each other at an elevated temperature.

This invention is further illustrated by the following examples and comparative examples in which all parts and percentages (%) are by weight unless otherwise indicated.

Further, the compounds used in the Examples and Comparative Examples are expressed by the symbols as shown below.

Indication of the Compounds Using the Symbols

R—(A$_1$)—Z$_1$—. . . —Z$_n$—(A$_n$)—X

| 1) Left terminal group R— | Symbol |
|---|---|
| C$_n$H$_{2n+1}$— | n- |

| 2) Ring structure —(A$_1$)—, —(A$_n$)— | Symbol |
|---|---|
|  | H |
|  | B |
| 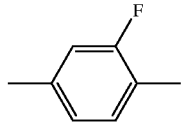 | B(F) |
| 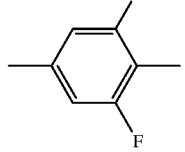 | B(F,F) |

| 3) Linking group —Z$_1$—, —Z$_n$— | Symbol |
|---|---|
| —CH$_2$CH$_2$— | 2 |
| —COO— | E |
| —C≡C— | T |
| —CF$_2$O— | CF2O |
| —CH=CH— | V |

| 4) Right terminal group —X | Symbol |
|---|---|
| —F | —F |
| —C$_n$H$_{2n+1}$ | -n |
| —Cl | —CL |
| —CF$_3$ | —CF3 |

| | |
|---|---|
| —OCF$_3$ | —OCF3 |
| —OCF$_2$H | —OCF2H |

5) Example of indication

3-HB(F,F)CF2OB(F,F)—F:

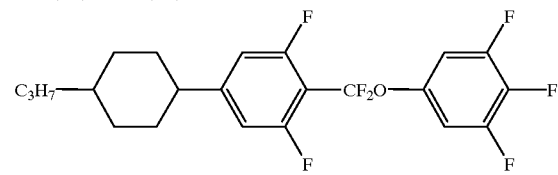

3-HHB(F,F)—F:

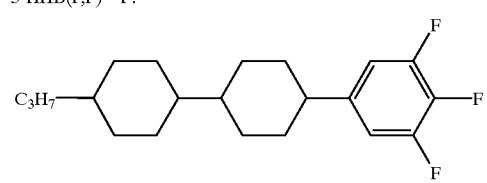

For the characteristics of the liquid crystal composition, the upper limit of the nematic phase transition temperature was expressed as T$_{NI}$, the lower limit of the nematic phase transition temperature was expressed as T$_c$, the viscosity was expressed as η, the optical anisotropy was expressed as Δn, the threshold voltage was expressed as Vth, the voltage holding ratio at 25° C. was expressed as VHR(25), the voltage holding ratio at 100° C. was expressed as VHR(100), the voltage holding ratio at 120° C. was expressed as VHR(120) and the response rate was expressed as τ.

T$_{NI}$ was determined by measuring the temperature of a nematic-isotropic phase transition during the temperature rising process using a polarization microscope. T$_c$ was judged by a liquid crystal phase which appeared after the liquid crystal composition was allowed to stand for 30 days in a freezer at 10° C., 0° C., -10° C., -20° C., -30° C. and -40° C., respectively. For example, when a liquid crystal composition is in a nematic state at -20° C., and in a crystallized or smectic state at -30° C., T$_c$ of the liquid crystal composition was expressed as <-20° C. η was measured at 20° C. Δn was measured at 25° C. by using a lamp with a wavelength of 589 nm for light source. Vth was measured at 25° C.

Vth refers to the value of voltage applied when a rectangular wave having a frequency of 32 Hz is applied in the normally white mode using a cell having a cell gap of (0.4/Δn) μm and a twist angle of 80° and a transmittance of light passing through the cell becomes 90%. The voltage holding ratio was determined in accordance with the area method.

τ was measured at a voltage applied where the response time of the liquid crystal rising (τ on) and the response time of the liquid crystal falling (τ off) becomes equal when cholesteryl nonanoate was added to the liquid crystal composition so that a pitch in the twist becomes 80 μm and the thus prepared composition was placed in a cell having a cell gap of (0.4/Δn) μm and a twist angle of 90°, to which a rectangular wave having a frequency of 32 Hz was applied. In this case, τ was measured at 25° C., and defined as a sum of the values τ on and τ off.

Comparative Example 1

The composition (Example 6) with the highest $T_{NI}$ of the compositions disclosed in Japanese Patent Kokai 8-73857 was prepared in the following manner.

| | |
|---|---|
| 2-HBEB(F,F)-F | 5% |
| 3-HBEB(F,F)-F | 5% |
| 5-HBEB(F,F)-F | 5% |
| 3-BBEB(F,F)-F | 5% |
| 2-HHB-CL | 5% |
| 4-HHB-CL | 10% |
| 5-HHB-CL | 5% |
| 3-H2BB(F,F)-F | 10% |
| 5-H2BB(F,F)-F | 10% |
| 3-HBB(F,F)-F | 10% |
| 5-HBB(F,F)-F | 10% |
| 3-HH2B(F,F)-F | 5% |
| 2-HHBB(F,F)-F | 5% |
| 3-HH2BB(F,F)-F | 5% |
| 4-HH2BB(F,F)-F | 5% |

The above composition had the following characteristics:
$T_{NI}$=113.6° C.
$T_c$<0° C.
η=38.3 mPa·s
Δn=0.133
Vth=1.64 V
VHR(25)=98.3%
VHR(120)=90.1%
τ=40 ms This composition had high $T_{NI}$, large Δn and relatively short response time, but high Vth, low VHR at high temperatures and high $T_c$.

Comparative Example 2

The composition (Example 2) with the lowest Vth of the compositions disclosed in Japanese Patent Kokai 8-73857 was prepared in the following manner.

| | |
|---|---|
| 5-HHEB(F,F)-F | 5% |
| 2-HBEB(F,F)-F | 5% |
| 3-HBEB(F,F)-F | 5% |
| 5-HBEB(F,F)-F | 5% |
| 3-BBEB(F,F)-F | 5% |
| 4-BBEB(F,F)-F | 5% |
| 5-BBEB(F,F)-F | 5% |
| 4-HEB(F,F)-F | 10% |
| 4-HB-CL | 10% |
| 7-HB(F)-F | 3% |
| 7-HB(F,F)-F | 9% |
| 3-HBB(F,F)-F | 10% |
| 5-HHB(F,F)-F | 10% |
| 3-H2BB(F,F)-F | 13% |

The above composition had the following characteristics:
$T_{NI}$=46.1° C.
$T_c$<-10° C.
η=36.3 mPa·s
Δn =0.096
Vth=0.91 V
VHR(25)=98.3%
VHR(100)=92.3%
τ=60 ms This composition had low Vth, but low $T_{NI}$, low VHR at high temperatures, small Δn and long response time.

Comparative Example 3

The composition (Example 5) with the highest $T_{NI}$ of the compositions disclosed in Japanese Patent Kokai 9-31460 was prepared in the following manner.

| | |
|---|---|
| 3-HHB(F,F)-F | 10% |
| 4-HHB(F,F)-F | 5% |
| 3-H2HB(F,F)-F | 10% |
| 5-H2HB(F,F)-F | 9% |
| 3-HH2B(F,F)-F | 11% |
| 5-HH2B(F,F)-F | 7% |
| 3-HBB(F,F)-F | 8% |
| 5-HBB(F,F)-F | 8% |
| 3-H2BB(F,F)-F | 4% |
| 5-H2BB(F,F)-F | 4% |
| 3-HBEB(F,F)-F | 3% |
| 4-HBEB(F,F)-F | 3% |
| 3-HHEB(F,F)-F | 10% |
| 4-H.HEB(F,F)-F | 4% |
| 5-HHEB(F,F)-F | 4% |

The above composition had the following characteristics:
$T_{NI}$=83.7° C.
$T_c$<-30° C.
η=28.5 mPa·s
Δn=0.090
Vth=1.21 V
VHR(25)=98.3%
VHR(100)=91.8%
τ=59 ms This composition had relatively high $T_{NI}$, but high Vth, small Δn and long response time.

Comparative Example 4

The composition (Example 7) with the lowest Vth of the compositions disclosed in Japanese Patent Kokai 9-31460 was prepared in the following manner.

| | |
|---|---|
| 7-HB(F,F)-F | 7% |
| 3-HHB(F,F)-F | 7% |
| 3-H2HB(F,F)-F | 3% |
| 3-HH2B(F,F)-F | 7% |
| 5-HH2B(F,F)-F | 5% |
| 3-HBB(F,F)-F | 21% |
| 5-HBB(F,F)-F | 21% |
| 2-HBEB(F,F)-F | 3% |
| 3-HBEB(F,F)-F | 5% |
| 5-HBEB(F,F)-F | 3% |
| 3-HHEB(F,F)-F | 10% |
| 4-HHEB(F,F)-F | 3% |
| 5-HHEB(F,F)-F | 5% |

The above composition had the following characteristics:
$T_{NI}$=61.4° C.
$T_c$<-30° C.
η=30.7 mPa·s
Δn=0.094
Vth=1.05 V
VHR(25)=98.3%
VHR(100)=92.5%
τ=51 ms This composition had low Vth, but low $T_{NI}$, small Δn and low VHR at high temperatures.

Comparative Example 5

The composition (Example 12) with the largest Δn of the compositions disclosed in Japanese Patent Kokai 9-31460 was prepared in the following manner.

| | |
|---|---|
| 7-HB(F,F)-F | 9% |
| 3-HHB(F,F)-F | 10% |
| 3-HH2B(F,F)-F | 7% |
| 5-HH2B(F,F)-F | 5% |
| 3-HBB(F,F)-F | 18% |
| 5-HBB(F,F)-F | 18% |
| 3-HBEB(F,F)-F | 5% |
| 5-HBEB(F,F)-F | 3% |
| 3-HHEB(F,F)-F | 8% |
| 5-HHEB(F,F)-F | 5% |
| 2-HHBB(F,F)-F | 4% |
| 3-HHBB(F,F)-F | 4% |
| 5-HH2BB(F,F)-F | 4% |

The above composition had the following characteristics:
$T_{NI}$=78.3° C.
$T_c$<−30° C.
η=30.2 mPa·s
Δn=0.103
Vth=1.21 V
VHR(25)=98.4%
VHR(100)=91.5%
τ=49 ms This composition had relatively small Δn, high threshold voltage and low VHR at high temperatures.

Comparative Example 6

The composition (Example 36) with the lowest Vth of the compositions disclosed in WO 96/11897 was prepared in the following manner.

| | |
|---|---|
| 3-HBCF2OB(F,F)-F | 5% |
| 5-HBCF2OB(F,F)-F | 10% |
| 5-HBCF2OB-CF3 | 5% |
| 5-HBCF2OB(F)-F | 5% |
| 3-HBCF2OB-OCF3 | 5% |
| 7-HB(F,F)-F | 8% |
| 3-HHB(F,F)-F | 6% |
| 4-HHB(F,F)-F | 3% |
| 3-H2HB(F,F)-F | 10% |
| 4-H2HB(F,F)-F | 6% |
| 5-H2HB(F,F)-F | 6% |
| 3-HH2B(F,F)-F | 10% |
| 5-HH2B(F,F)-F | 5% |
| 3-HBB(F,F)-F | 5% |
| 5-HBB(F,F)-F | 5% |
| 3-HHBB(F,F)-F | 3% |
| 3-HH2BB(F,F)-F | 3% |

The above composition had the following characteristics:
$T_{NI}$=61.8° C.
$T_c$<−20 C.
η=23.6 mPa·s
Δn=0.083
Vth=1.50 V
VHR(25)=98.7%
VHR(100)=95.6%
τ=40 ms This composition had low viscosity, but small Δn, high threshold voltage and low $T_{NI}$.

Comparative Example 7

The composition (Example 37) with the largest Δn of the compositions disclosed in WO 96/11897 was prepared in the following manner.

| | |
|---|---|
| 3-HBCF2OB(F,F)-F | 5% |
| 3-HBCF2OB-OCF3 | 5% |
| 3-HB-CL | 4% |
| 5-HB-CL | 4% |
| 7-HB-CL | 5% |
| 2-HHB-CL | 6% |
| 3-HHB-CL | 7% |
| 5-HHB-CL | 6% |
| 2-HBB(F)-F | 6% |
| 3-HBB(F)-F | 6% |
| 5-HBB(F)-F | 12% |
| 3-HBB(F,F)-F | 13% |
| 5-HBB(F,F)-F | 13% |
| 3-H2HB(F)-CL | 3% |
| 3-HB(F)TB-2 | 3% |
| 3-HB(F)VB-2 | 2% |

The above composition had the following characteristics:
$T_{NI}$=89.3° C.
$T_c$<−20° C.
η=21.9 mPa·s
Δn=0.128
Vth=2.08 V
VHR(25)=98.4%
VHR(100)=93.5%
τ=30 ms This composition had low viscosity and large Δn, but high threshold voltage and somewhat low VHR at high temperatures.

EXAMPLE 1

The following liquid crystal composition was prepared.
First Component

| | |
|---|---|
| 2-HB(F,F)CF2OB(F,F)-F | 15% |
| 3-HB(F,F)CF2OB(F,F)-F | 15% |
| 4-HB(F,F)CF2OB(F,F)-F | 15% |
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |

Second Component

| | |
|---|---|
| 3-HBB(F,F)-F | 10% |
| 2-HHBB(F,F)-F | 5% |
| 3-HHBB(F,F)-F | 5% |
| 4-HHBB(F,F)-F | 5% |
| 5-HHBB(F,F)-F | 5% |
| 3-HH2BB(F,F)-F | 5% |

The above composition had the following characteristics:
$T_{NI}$=84.2° C.
$T_c$<−20° C.
η=44.0 mPa·s
Δn=0.106
Vth=1.04 V
VHR(25)=98.7%
VHR(100)=95.1%
τ=57 ms This composition had high VHR at high temperatures, small Vth, large Δn and fast τ.

EXAMPLE 2

The following liquid crystal composition was prepared.
First Component

| | |
|---|---|
| 3-HB(F,F)CF2OB(F,F)-F | 6% |
| 5-HB(F,F)CF2OB(F,F)-F | 5% |
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |

Second Component

| | |
|---|---|
| 3-HHB(F,F)-F | 5% |
| 3-H2HB(F,F)-F | 5% |
| 4-H2HB(F,F)-F | 5% |
| 5-H2HB(F,F)-F | 5% |
| 3-HBB(F,F)-F | 19% |
| 5-HBB(F,F)-F | 19% |
| 2-HHBB(F,F)-F | 4% |
| 3-HHBB(F,F)-F | 4% |
| 4-HHBB(F,F)-F | 3% |

The above composition had the following characteristics:
$T_{NI}$=80.6° C.
$T_c$<−30° C.
τ=39.0 mPa·s
Δn=0.110
Vth=1.20 V
VHR(25)=98.7%
VHR(100)=95.8%
τ=40 ms This composition had high VHR at high temperatures, small Vth, large Δn and fast τ.

EXAMPLE 3

The following liquid crystal composition was prepared.
First Component

| | |
|---|---|
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |
| 2-HH2B(F,F)CF2OB(F,F)-F | 4% |
| 3-HH2B(F,F)CF2OB(F,F)-F | 4% |

Second Component

| | |
|---|---|
| 3-HBB(F,F)-F | 27% |
| 5-HBB(F,F)-F | 27% |
| 3-H2BB(F,F)-F | 5% |
| 5-H2BB(F,F)-F | 5% |
| 2-HHBB(F,F)-F | 4% |
| 3-HHBB(F,F)-F | 4% |

The above composition had the following characteristics:
$T_{NI}$=77.1° C.
$T_c$<−20° C.
η=44.0 mPa·s
Δn=0.123
Vth=1.19 V
VHR(25)=98.7%
VHR(100)=96.2%
τ=45 ms This composition had high VHR at high temperatures, small Vth, large Δn and fast τ.

EXAMPLE 4

The following liquid crystal composition was prepared.
First Component

| | |
|---|---|
| 3-HB(F,F)CF2OB(F)-OCF3 | 4% |
| 4-HB(F,F)CF2OB(F)-OCF3 | 4% |
| 5-HB(F,F)CF2OB(F)-OCF3 | 3% |
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |

Second Component

| | |
|---|---|
| 3-HH2B(F,F)-F | 5% |
| 3-H2HB(F,F)-F | 5% |
| 4-H2HB(F,F)-F | 5% |
| 5-H2HB(F,F)-F | 5% |
| 3-HBB(F,F)-F | 19% |
| 5-HBB(F,F)-F | 19% |
| 2-HHBB(F,F)-F | 4% |
| 3-HHBB(F,F)-F | 4% |
| 4-HHBB(F,F)-F | 3% |

The above composition had the following characteristics:
$T_{NI}$=84.0° C.
$T_c$<−30° C.
η=38.0 mPa·s
Δn=0.112
Vth=1.23 V
VHR(25)=98.7%
VHR(100)=96.0%
τ=38 ms This composition had high VHR at high temperatures, small Vth, large Δn and fast τ.

EXAMPLE 5

The following liquid crystal composition was prepared.
First Component

| | |
|---|---|
| 2-HHB(F,F)CF2OB(F)-F | 5% |
| 3-HHB(F,F)CF2OB(F)-F | 5% |
| 2-HHB(F,F)CF2OB(F)-OCF3 | 5% |
| 3-HHB(F,F)CF2OB(F)-OCF3 | 5% |
| 2-HHB(F,F)CF2OB(F,F)-F | 4% |
| 3-HHB(F,F)CF2OB(F,F)-F | 4% |

Second Component

| | |
|---|---|
| 3-HBB(F,F)-F | 27% |
| 5-HBB(F,F)-F | 27% |
| 3-H2BB(F,F)-F | 5% |
| 5-H2BB(F,F)-F | 5% |

-continued

| | |
|---|---|
| 2-HHBB(F,F)-F | 4% |
| 3-HHBB(F,F)-F | 4% |

The above composition had the following characteristics:
$T_{NI}$=79.3° C.
$T_c$<−20° C.
η=42.0 mPa·s
Δn=0.125
Vth=1.20 V
VHR(25)=98.7%
VHR(100)=95.5%
τ=42 ms This composition had high VHR at high temperatures, small Vth, large Δn and fast τ.

EXAMPLE 6

The following liquid crystal composition was prepared.
First Component

| | |
|---|---|
| 3-HB(F,F)CF2OB(F)-F | 3% |
| 3-HB(F,F)CF2OB(F)-OCF2H | 2% |
| 3-HB(F,F)CF2OB(F,F)-OCF3 | 2% |
| 3-H2B(F,F)CF2OB(F,F)-F | 2% |
| 3-HB(F,F)CF2OB(F,F)-OCF2H | 2% |
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |

Second Component

| | |
|---|---|
| 3-HH2B(F,F)-F | 5% |
| 3-H2HB(F,F)-F | 5% |
| 4-H2HB(F,F)-F | 5% |
| 5-H2HB(F,F)-F | 5% |
| 3-HBB(F,F)-F | 19% |
| 5-HBB(F,F)-F | 19% |
| 2-HHBB(F,F)-F | 4% |
| 3-HHBB(F,F)-F | 4% |
| 4-HHBB(F,F)-F | 3% |

The above composition had the following characteristics:
$T_{NI}$=85.3° C.
$T_c$<−20° C.
η=38.5 mPa·s
Δn=0.120
Vth=1.21 V
VHR(25)=98.5%
VHR(100)=95.9%
τ=36 ms This composition had high VHR at high temperatures, small Vth, large Δn and fast τ.

EXAMPLE 7

The following liquid crystal composition was prepared.
First Component

| | |
|---|---|
| 2-H2B(F,F)CF2OB(F)-F | 2% |
| 3-H2B(F,F)CF2OB(F)-OCF3 | 2% |
| 2-H2B(F,F)CF2OB(F,F)-OCF3 | 2% |

-continued

| | |
|---|---|
| 2-HB(F,F)CF2OB(F,F)-F | 10% |
| 3-HB(F,F)CF2OB(F,F)-F | 14% |
| 4-HB(F,F)CF2OB(F,F)-F | 15% |
| 2-HHB(F,F)CF2OB(F)-OCF2H | 2% |
| 3-HHB(F,F)CF2OB(F,F)OCF3 | 2% |
| 2-HHB(F,F)CF2OB(F,F)-F | 4% |
| 3-HHB(F,F)CF2OB(F,F)-F | 4% |
| 4-HHB(F,F)CF2OB(F,F)-F | 4% |
| 5-HHB(F,F)CF2OB(F,F)-F | 4% |

Second Component

| | |
|---|---|
| 3-HBB(F,F)-F | 10% |
| 2-HHBB(F,F)-F | 5% |
| 3-HHBB(F,F)-F | 5% |
| 4-HHBB(F,F)-F | 5% |
| 5-HHBB(F,F)-F | 5% |
| 3-HH2BB(F,F)-F | 5% |

The above composition had the following characteristics:
$T_{NI}$=85.0° C.
$T_c$<−20° C.
η=41.0 mPa·s
Δn=0.110
Vth=1.12 V
VHR(25)=98.7%
VHR(100)=95.3%
τ=52 ms This composition had high VHR at high temperatures, small Vth, large Δn and fast τ.

EXAMPLE 8

The following liquid crystal composition was prepared.

| | |
|---|---|
| First Component: | |
| 2-HB(F,F)CF2OB(F,F)-F | 15% |
| 3-HB(F,F)CF2OB(F,F)-F | 15% |
| 4-HB(F,F)CF2OB(F,F)-F | 15% |
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |
| Second Component: | |
| 3-HBB(F,F)-F | 10% |
| 2-HHBB(F,F)-F | 5% |
| 3-HHBB(F,F)-F | 5% |
| 4-HHBB(F,F)-F | 5% |
| 5-HHBB(F,F)-F | 5% |
| Third Component: | |
| 5-HBB(F)B-2 | 5% |

The above composition had the following characteristics:
$T_{NI}$=84.2° C.
$T_c$<−20° C.
η=43.6 mPa·s
Δn=0.111
Vth=1.12 V
VHR(25)=98.7%
VHR(100)=96.1%
τ=49 ms This composition had high VHR at high temperatures, small Vth, large Δn and fast τ.

EXAMPLE 9

The following liquid crystal composition was prepared.

| First Component: | |
|---|---|
| 3-HB(F,F)CF2OB(F,F)-F | 6% |
| 5-HB(F,F)CF2OB(F,F)-F | 5% |
| 2-HHB(F,F)CF2OB(F,F)-F | 5% |
| 3-HHB(F,F)CF2OB(F,F)-F | 5% |
| 4-HHB(F,F)CF2OB(F,F)-F | 5% |
| 5-HHB(F,F)CF2OB(F,F)-F | 5% |
| Second Component: | |
| 3-HHB(F,F)-F | |
| 3-H2HB(F,F)-F | 5% |
| 4-H2HB(F,F)-F | 5% |
| 5-H2HB(F,F)-F | 5% |
| 3-HBB(F,F)F | 19% |
| 5-HBB(F,F)-F | 19% |
| Third Component: | |
| 5-HBB(F)B-2 | 6% |
| 5-HBB(F)B-3 | 5% |

The above composition had the following characteristics:
$T_{NI}$=80.6° C.
$T_c$<−20° C.
η=36.8 mPa·s
Δn=0.121
Vth=1.26 V
VHR(25)=98.7%
VHR(100)=95.6%
τ=39 ms This composition had high VHR at high temperatures, small Vth, large Δn and fast τ.

As shown in the above Examples, the present invention can provide the liquid crystal compositions for AM-LCD, especially having high voltage holding ratio at high temperatures, sufficiently low threshold voltage and large optical anisotropy, while satisfying general characteristics required for the AM-CD display mode.

What is claimed is:

1. A liquid crystal composition which consisting of:
a first component consisting of at least one compound selected from formulas (1-1) and (1-2)

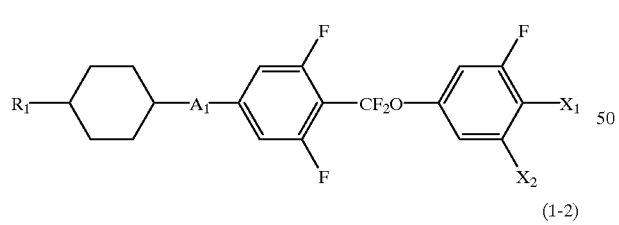

(1-1)

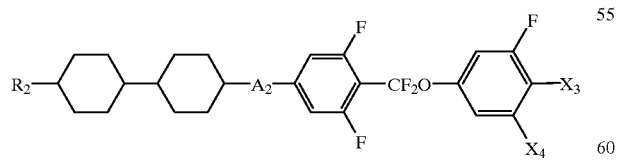

(1-2)

a second component consisting of at least one compound selected from formulas (2-1), (2-2) and 2-3

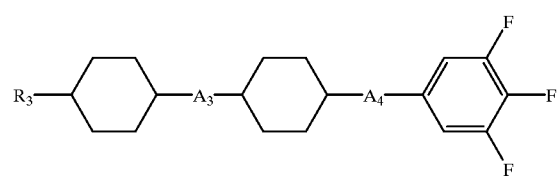

(2-1)

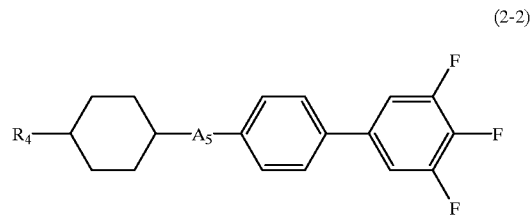

(2-2)

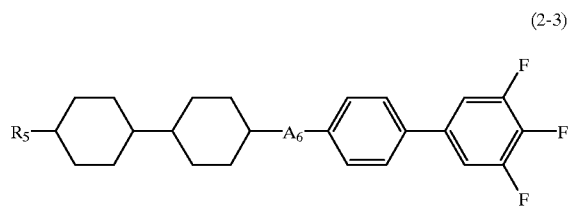

(2-3)

and a third component consisting of at least one compound having the following formula (3)

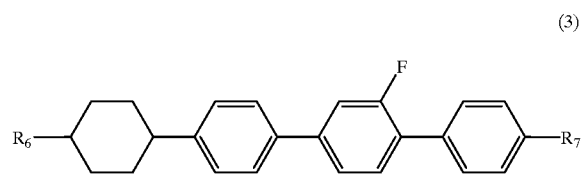

(3)

wherein $R_1$, $R_2$, $R_3$, $R_4$, $R_5$, $R_6$ and $R_7$ each independently represent an alkyl group of 1–10 carbons, $A_1$, $A_2$, $A_3$, A4, $A_5$ and A6 each independently represent —CH$_2$CH$_2$— or a single bond, provided that at least one of $A_3$ and $A_4$ is a single bond; $X_1$ and $X_3$ each independently represent F, —OCF$_3$ or —OCF$_2$H; and $X_2$ and $X_4$ each independently represent H or F.

2. The liquid crystal composition of claim 1 wherein the first component comprises 20–70% by weight, the second component comprises 30–80% by weight and the third component comprises no more than 20% by weight, based on the total weight of the liquid crystal composition.

3. A liquid crystal display device comprising the liquid crystal composition set forth in claim 1.

* * * * *

UNITED STATES PATENT AND TRADEMARK OFFICE
CERTIFICATE OF CORRECTION

PATENT NO.    : 6,335,064 B1
DATED         : January 1, 2002
INVENTOR(S)   : Yoshitaka Tomi et al.

It is certified that error appears in the above-identified patent and that said Letters Patent is hereby corrected as shown below:

Column 22,
Line 47, change "A4" -- $A_4$ -- and "A6" to -- $A_6$ --.

Signed and Sealed this

Fourth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,335,064 B1
DATED          : January 1, 2002
INVENTOR(S)    : Yoshitaka Tomi et al.

It is certified that error appears in the above-identified patent and that said Letters Patent is hereby corrected as shown below:

<u>Column 22,</u>
Line 47, change "A4" to -- $A_4$ -- and "A6" to -- $A_6$ --.

This certificate supersedes Certificate of Correction issued June 4, 2002.

Signed and Sealed this

Twentieth Day of August, 2002

Attest:

Attesting Officer

JAMES E. ROGAN
*Director of the United States Patent and Trademark Office*